United States Patent [19]
Maxwell

[11] 3,934,835
[45] Jan. 27, 1976

[54] CHART CARRIER FOR RECORDER

[75] Inventor: John Maxwell, Chatham, N.J.

[73] Assignee: Wagner Electric Corporation, Parsippany, N.J.

[22] Filed: June 28, 1973

[21] Appl. No.: 374,526

[52] U.S. Cl. .................. 242/67.2; 226/83; 226/89; 242/67.3; 242/68.4; 346/136
[51] Int. Cl.² ......................................... B65H 17/38
[58] Field of Search ....... 242/67.2, 67.3, 71.2, 68.4; 346/136, 145; 40/347, 31, 86 R, 86 A, 95; 226/82, 83, 89, 168, 196, 198

[56] References Cited
UNITED STATES PATENTS

| | | |
|---|---|---|
| 613,178 | 10/1898 | Unz ..................................... 242/68.4 |
| 1,714,650 | 5/1929 | Webb ................................. 40/86 R |
| 1,815,681 | 7/1931 | Schellentrager .................. 242/67.2 |
| 3,281,090 | 10/1966 | Baranowski ..................... 242/67.3 R |
| 3,294,212 | 12/1966 | Gearheart et al. ............. 346/145 X |
| 3,317,154 | 5/1967 | Leslie ................................. 242/71.2 |
| 3,365,826 | 1/1968 | Mandas ............................. 40/86 R |
| 3,498,559 | 3/1970 | Sames ................................ 242/67.2 |

*Primary Examiner*—Stanley N. Gilreath
*Assistant Examiner*—John M. Jillions
*Attorney, Agent, or Firm*—Eyre, Mann & Lucas

[57] ABSTRACT

An improved chart carrier for a recorder permitting use with a take-up spool for relatively long periods of time, and without the take-up spool for shorter periods of time, a cylindrical enclosure being employed for rolling and enclosedly retaining the used portion of the chart in a predetermined portion of the chart carrier.

3 Claims, 2 Drawing Figures

CHART CARRIER FOR RECORDER

CROSS-REFERENCE TO RELATED APPLICATIONS

The improvement disclosed herein can advantageously be used in a chart carrier for the information recorders disclosed in U.S. Pat. No. 3,683,399, entitled INFORMATION RECORDER, issued on Aug. 8, 1972 to William A. Rock, and U.S. Pat. No. 3,673,608, entitled INFORMATION RECORDER, issued on June 27, 1972 to Henry Voorman Jr., both patents being assigned to the assignee of the present application.

BACKGROUND OF THE INVENTION

Conventional chart carriers in which the chart is drawn from a roll, used, and the rewound, use takeup spools to accomplish the rewinding and storage of the used portion of the chart. When removing a used portion of the chart, it is necessary to remove the spool, tear the used portion from the unused portion and then remove the wound chart from the spool. This procedure is satisfactory when a long period of time and a lengthy portion or an entire roll of chart are involved, but it tends to be inconvenient when the used portion of the chart is short and represents a time period of only a day or even a few hours. The principal object of this invention is to obviate the aforesaid drawback.

SUMMARY OF THE INVENTION

The present invention is embodied in and carried out by a chart carrier which eliminates the need for a take-up spool for winding the used portion of the chart. The improvement enables removal of the take-up spool by providing means defining a space in a predetermined portion of the chart carrier, into which space the used portion of the chart is rolled and stored.

DETAILED DESCRIPTION OF THE PREFERRED EMBODIMENT

Figure 1:
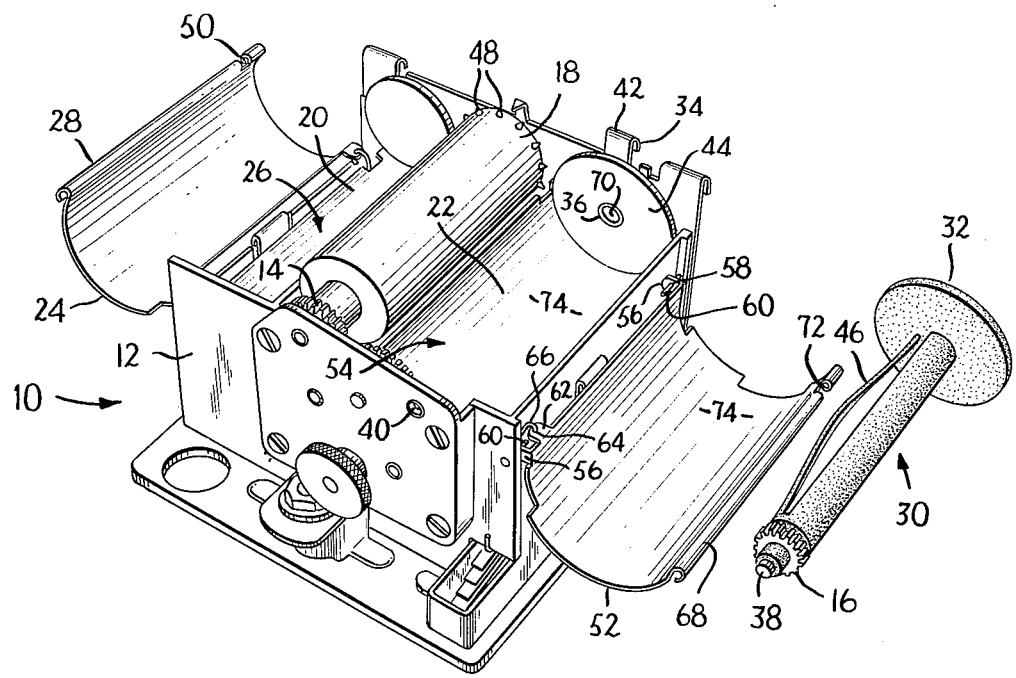
FIG. 1 shows an isometric view of the improved chart carrier with the spool shown in an exploded relationship thereto.

Referring to FIG. 1, the improved chart carrier 10 for use in a vehicle information-recorder (not shown) is shown. The housing 12 contains an electrically driven clock (not shown) having a geared, time-proportionate output (not shown) coupled in conventional manner to the chart carrier gear train (not fully shown) comprising gears 14 and 16. Driven cylinder 18 is rigidly connected to driven cylinder gear 14, which is coupled to the gear train, and rotatably connected at both ends thereof to the housing 12. Thus, cylinder 18 is caused to rotate in conventional manner by operation of the electrically driven clock, the gear train, and driven cylinder gear 14. Adjacent both sides of driven cylinder 18 are approximately semi-cylindrical spaces 20 and 22 formed in housing 12. Semi-cylindrical space 20 is closed by an approximately semi-cylindrical cover 24 (shown in its open position) made of aluminum or some other suitable metal or plastic to form a cylindrical enclosure 26. Semi-cylindrical cover 24 is pivotally fastened at each end to housing 12 in conventional manner, and is urged into a closed position by conventional spring means to form the enclosure 26. Cover 24 has a rolled end 28 which contacts driven cylinder 18 when cover 24 is in the closed position. Cover 24 may be pivoted against the spring action to completely expose semi-cylindrical space 20 as shown in FIG. 1.

Figure 2:
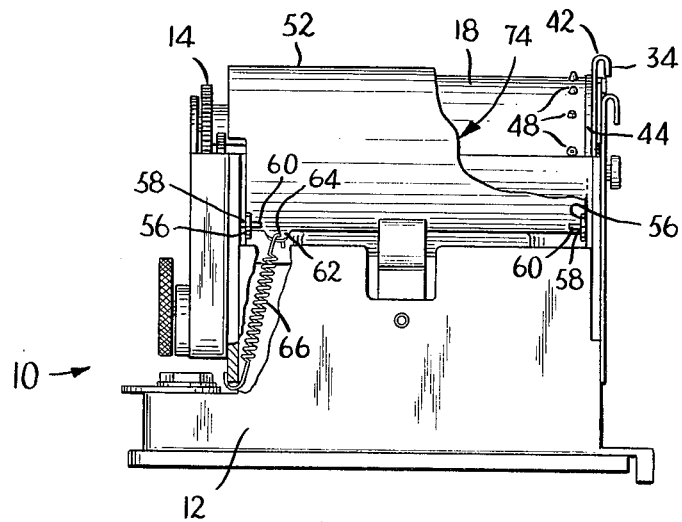
FIG. 2 shows an end view of the improved chart carrier without the spool.

A take-up spool 30 may be disposed in semi-cylindrical space 22. FIG. 2 shows the spool 30 removed. One end 32 of take-up spool 30 is rotatably connected to spool-holder 34 by engagement of a pin (not shown) with bushing 36. The other end of spool 30 is rigidly connected to gear 16, and has a pin 38 for rotatable engagement with bushing 40. Thus, gear 16 is selectively added to or removed from the chart carrier and coupled to the gear train with the addition or removal of spool 30. Spool-holder 34 is spring-mounted to housing 12 by a leaf spring 42, near the free end of which disc 44 and bushing 36 are mounted. By overcoming the leaf spring tension in the spool-holder 34 and displacing it, spool 30 may be axially displaced and removed. Cut through spool 30 is an axial slot 46 which extends for nearly the length of the spool. Disposed about the circumference of one end of driven cylinder 18 are spaced frustro-conical projections 48. In rolled end 28 at one end of cover 24, an aperture or notch 50 is cut, into which projections 48 freely fit and pass as driven cylinder 18 rotates. Another semi-cylindrical cover 52 which will be described more fully hereafter is provided to partially enclose spool 30 and form a cylindrical enclosure with space 22 and disc 44. Cover 52 is not required unless the spool 30 is removed.

Operation of the carrier with a spool is as follows. Cover 24 is pivoted against a spring bias to expose space 20. A chart roll (not shown) of the type having perforations near one edge thereof is inserted into the exposed space 20. A sufficient portion of the chart is unwound and extended over cylinder 18 coming into contact with a portion thereof, with the cylinder projections 48 aligned and extending through the chart perforations. Cover 52 is then pivoted into its open position as shown in FIG. 1, and the free end of the chart is inserted into spool slot 46 and the spool is then rotated to "thread" the chart onto the spool. Covers 24 and 52 are pivoted closed to form cylindrical enclosures 26 and 54, respectively, thereby retaining the chart roll and enclosing spool 30. The chart is unwound from the chart roll and rewound on spool 30 in conventional manner by operation of the electrical clock, the gear train, gears 14 and 16, the chart perforations and the cylinder projections 48. Cover 24, urged against cylinder 18 by conventional spring means, maintains the chart in contact with the cylinder and the chart perforations in alignment with the cylinder projections 46. The driven cylinder projections 48 bearing within the chart perforations, in conjunction with the driven take-up spool 30, unwind the chart from the roll, pass it over the cylinder 18, and rewind it on the spool 30. As the chart passes over cylinder 18, markings may be made thereon in known manner. To remove a used portion of the chart, cover 52 is pivoted to its open position and spool 30 is removed as described hereinabove and the used chart portion is torn from the unused portion. The used portion must then be unwound from the spool 30 or another spool inserted for subsequent operation. The chart then must be re-threaded to the spool as described hereinabove.

Referring to FIG. 1, and to FIG. 2 in which an end view of the improved carrier is shown and wherein like numerals refer to like parts as shown in FIg. 1, the improved chart carrier with the spool 30 removed will be described. The substantially semi-cylindrical cover 52, made of aluminum or some other suitable metal or plastic, is pivotally connected to housing 12 by providing tabular projections 56 bent over at both ends of the cover. An aperture 58 is provided in each tabular projection 56 and a pin 60, secured to the housing, is inserted into each aperture 58 to pivotally mount the cover 52 on the housing 12. Another tabular projection 62 having an aperture 64 is provided for connecting a spring 66 to the cover. The other end of the spring 66 is connected to the housing in a conventional manner. The spring 66 urges cover 52 into the closed position shown in FIG. 2 with the rounded free edge 68 of the cover 52 coming into contact with the driven cylinder 18 to form a substantially cylindrical enclosure 54 with the semi-cylindrical space 22 and disc 44. Spool holder 34 comprises leaf spring 42 with disc 44 to form one end of the cylindrical enclosure 54. An aperture 70 is provided in disc 44 to permit the pin (not shown) at one end of spool 30 to be rotatably mounted in bushing 36 of spool holder 34. When the force of spring 66 is overcome, cover 52 may be pivoted into its open position as shown in FIG. 1 to expose space 22.

Operation of the improved carrier without a spool is as follows. A chart roll is inserted into space 20 as described hereinabove, and the running end is passed over cylinder 18 while aligning the chart perforations with the cylinder projections 48. Cover 52 is pivoted into its open position and a portion of the chart is inserted into the exposed semi-cylindrical space 22. Cover 52 is pivoted to its closed position, forming a cylindrical space 54, with the semi-cylindrical space 22 and disc 44 to complete the "threading" operation. Projections 48 bearing on the chart perforations unwind the chart as described hereinabove. A notch 72 is provided in the rounded free edge 68 of cover 52 through which the projections 48 freely fit and pass as described for cover 24. The used portion of the chart is forced into cylindrical space 54 and slides and follows the inner periphery 74 of the enclosure to wind the used portion of the chart without a spool. To remove the used portion of the chart, all that is required is to pivot the cover 52 and tear the used portion of the chart from the unused portion. Re-threading is simply accomplished as described hereinabove.

Of course, it is not necessary to insert a full or partially full conventional chart roll into semi-cylindrical space 20, as a loosely wound relatively short portion of chart sufficient for the time period desired would suffice. In such a case, the entire chart is simply removed after being used.

The advantages of the present invention, as well as certain changes and modifications of the disclosed embodiment thereof, will be readily apparent to those skilled in the art. It is the Applicant's intention to cover all those changes and modifications which could be made to the embodiment of the invention herein chosen for the purposes of the disclosure without departing from the spirit and scope of the invention.

What is claimed is:

1. A chart carrier comprising:
   a. a housing;
   b. chart storage means;
   c. driving means comprising a driven cylinder;
   d. chart take-up means comprising a substantially cylindrical enclosure for rolling and enclosedly retaining the used portion of the chart fed in from said chart storage means by said driving means, said enclosure comprising (i) a substantially semi-cylindrical cover having a rounded free edge, and (ii) a substantially semi-cylindrical base portion disposed in said housing, said chart take-up means further comprising means for pivotally mounting said cover along its outer edge on said housing and means for urging said cover toward said driven cylinder, said cover being operative when in a first position to form said substantially cylindrical enclosure with said substantially semi-cylindrical base portion, and further operative when in a second, pivoted position to expose said substantially semi-cylindrical base portion; and
   e. retaining means operative to receive and rotatably retain a removable take-up spool, said retaining means comprising a leaf spring having a fixed end attached to said housing and a free end extending into said substantially cylindrical enclosure near one end thereof, a bushing mounted in said leaf spring near said free end thereof, and a disc having a central aperture therein and mounted near said free end of said leaf spring with said aperture in registration with said bushing, and an opposed end wall having an aperture therein aligned with said bushing in said central aperture of said disc along the axis of said substantially cylindrical enclosure.

2. The chart carrier according to claim 1 wherein said driven cylinder includes a plurality of spaced apart projections extending about the circumference of said driven cylinder near one end thereof, and said cover includes a notch positioned in said rounded free edge near one end thereof, said projections and said notch being aligned, said projections being operative to drivingly engage the chart and to pass through said notch when said driven cylinder is rotated.

3. The chart carrier according to claim 1 further comprising a removeable take-up spool adapted to be rotatably coupled to said drive means when rotatably retained by said retaining means within said substantially cylindrical enclosure, one end of said take-up spool being rotatably received at one end in said aperture of said opposed end wall and at the other end in said bushing.

* * * * *